US006856819B2

(12) United States Patent
Itoh

(10) Patent No.: US 6,856,819 B2
(45) Date of Patent: Feb. 15, 2005

(54) PORTABLE WIRELESS UNIT

(75) Inventor: Ryoh Itoh, Tokyo (JP)

(73) Assignee: NEC Corporation, Tokyo (JP)

( * ) Notice: Subject to any disclaimer, the term of this patent is extended or adjusted under 35 U.S.C. 154(b) by 671 days.

(21) Appl. No.: 09/800,538

(22) Filed: Mar. 7, 2001

(65) Prior Publication Data

US 2001/0021643 A1 Sep. 13, 2001

(30) Foreign Application Priority Data

Mar. 7, 2000 (JP) ....................................... 2000-062009

(51) Int. Cl.[7] ................................................ H04M 1/00
(52) U.S. Cl. ................. 455/575.7; 455/129; 455/562.1; 343/700; 343/702
(58) Field of Search ........................... 455/13.3, 19, 25, 455/63.4, 82, 83, 562.1, 575.1, 575.7, 575.8, 90.3, 129, 128, 112, 113, 90, 575; 343/702, 700, 846, 824, 826, 829–830

(56) References Cited

U.S. PATENT DOCUMENTS

| | | | | |
|---|---|---|---|---|
| 5,243,353 A | | 9/1993 | Nakahara et al. | |
| 5,410,323 A | * | 4/1995 | Kuroda ................ | 343/700 MS |
| 6,150,982 A | * | 11/2000 | Bergstedt et al. .... | 343/700 MS |

FOREIGN PATENT DOCUMENTS

| | | |
|---|---|---|
| EP | 0 980 113 A2 | 2/2000 |
| EP | 0 980 113 A3 | 3/2001 |
| GB | 2 226457 A | 6/1990 |
| JP | 62-188504 | 8/1987 |
| JP | 8-195609 | 7/1996 |
| JP | 8-335818 | 12/1996 |
| JP | 9-139622 | 5/1997 |
| JP | 9-148838 | 6/1997 |
| JP | 10-154909 | 6/1998 |
| JP | 2001-85920 | 3/2001 |
| WO | WO 99/27609 | 6/1999 |

OTHER PUBLICATIONS

K. Fujimoto, Y. Yamada, K. Tsunekawa, “ZUKAI Mobile Communications Antenna System”, p. 126, Fig. (f), Sougou–Denshi–Sha.

Arai et al., “A Design of Uni–directional Potable Terminal Antenna and Effect of Phantom”, SB–1–12 (1999), p. 652.

Shinji Sakai, et al., “Miniaturization of Parasitic Element for Radiation Gain Enhancement of Small Antenna”, Mitsubishi Materials Corp. (1998).

* cited by examiner

*Primary Examiner*—Pablo N. Tran
(74) *Attorney, Agent, or Firm*—Scully, Scott, Murphy & Presser

(57) ABSTRACT

A portable wireless unit of the invention has a first plane antenna smaller than an antenna size determined by a desired frequency, and a second plane antenna presenting an antenna size determined by the desired frequency on the whole by coupling with the first plane antenna.

4 Claims, 5 Drawing Sheets

PORTABLE WIRELESS UNIT

FIELD OF THE INVENTION

The present invention relates to a portable wireless unit, and more particularly to a portable wireless unit, e.g. cellular phone, using a plane antenna such as plate-form inverted F type antenna.

BACKGROUND OF THE INVENTION

Most of handy-type portable wireless units used in a gigahertz band are provided a whip antenna that is accommodated in the case, or a plane antenna such as a plate-form inverted F type antenna that is built in the case.

FIG. 1 shows a cellular phone, which is one of the conventional portable wireless units.

In a case 61, a circuit board 62 mounting the transmission and reception circuit (not shown) is accommodated, and numeric keys, function keys and liquid-crystal display (neither shown) are provided on the front side (backside of the case 61 in the drawing) of the case 61 formed by resin molding, and a whip antenna 63 (for transmission and reception), which can be retracted in the case 61, in flexible structure is disposed in the upper part of the case 61. A plate-form inverted F type antenna 64 is disposed in the vicinity of the backside wall of the case 61. The plate-form inverted F type antenna 64 comprises a radiation plate 64*a* and a short-circuit plate 64*b* that is formed in part of the radiation plate 64*a* and soldered to the earth land or shield plate of the circuit board 62. A power feed wire 65 is connected to a given position of the radiation plate 64*a*.

As is generally known, the plate-form inverted F type antenna 64 is designed to satisfy an expression, $L=W\cdot\lambda/4$, where the length of the radiation plate 64*a* is L, the width is W, and the wavelength is $\lambda$. It also has a characteristic that the bandwidth widens as the interval h of the radiation plate 64*a* and earth land or ground plate increases, and the efficiency (gain) lowers as the volume of the case (casing) decreases.

In the portable wireless unit in FIG. 1, the combination of the plate-form inverted F type antenna 64 and the whip antenna 63 composes a diversity antenna, thereby the multi-path fading can be decreased.

In the conventional portable wireless unit, however, if attempted to use a portable wireless unit accommodating the antenna (plane antenna) at a desired service frequency (hereinafter called desired frequency), the antenna needs to have a size according to the design value. Therefore, there occur problems that it becomes difficult to install its internal parts inside the case, it becomes difficult to get the sufficient frequency band, and the radiation efficiency (antenna efficiency) is likely to lower. In addition, there is a problem that the case space cannot be used efficiently.

To solve these problems, reported is, for example, Arai et al., "A Design of Uni-directional Potable Terminal Antenna and Effect of Phantom", the general meeting of Institute of Electronics and Communication Engineers of Japan, SB-1-12 (1999).

SUMMARY OF THE INVENTION

It is an object of the invention to provide a portable wireless unit capable of enhancing the antenna characteristics, while reducing the occupied area in the case, by using an incorporated antenna such as plane antenna.

The invention provides a portable wireless unit comprising a first plane antenna, disposed on a circuit board incorporated within a casing of the wireless unit, for receiving a current for excitation thereof, the first plane antenna having a single resonant frequency and a smaller size than a size associated with a desired frequency, and a parasitic second plane antenna, provided on an outer surface or inner surface of said casing, for presenting, when coupled together with said first plane antenna, an antenna size associated with said desired frequency.

According to this arrangement, the first plane antenna and second plane antenna do not exhibit an independent resonance function, but instead function together to resonate at the desired frequency. The resonance frequency of the first plane antenna is reduced below the desired frequency when the first and second plane antennas are coupled. Accordingly, the size of the first plane antenna may be reduced below the size it would have if it alone produced the desired frequency. The smaller size of the first plane antenna means that a higher frequency than the desired frequency, associated with the first plane antenna by itself. Thus, the area occupied by the first plane antenna in the case is reduced, and the space in the case can be utilized effectively. Further, by coupling of the first plane antenna and second plane antenna, the effective antenna area can be increased, and the occupied area of antenna in the case is smaller. Thus, the antenna characteristic can be enhanced.

BRIEF DESCRIPTION OF THE DRAWINGS

Preferred features of the present invention will now be described, by way of example only, with reference to the accompanying drawings, in which.

DESCRIPTION OF THE PREFERRED EMBODIMENTS

Preferred embodiments of the invention are described below while referring to the accompanying diagrams.

Figure 1:
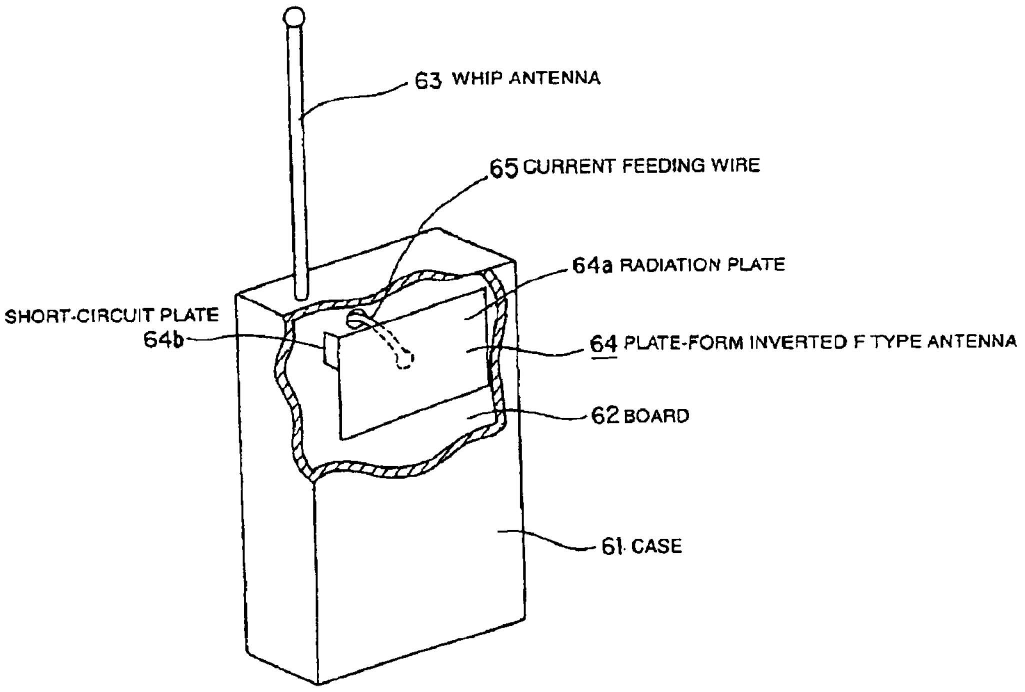
FIG. 1 PRIOR ART
FIG. 1 is a perspective view showing an example of a conventional portable wireless unit.
Figure 2:
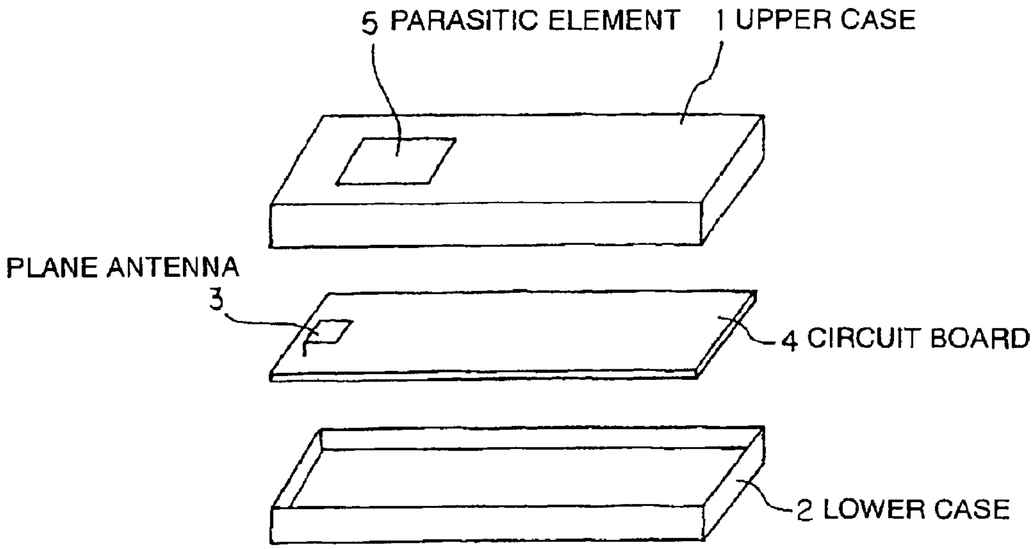
FIG. 2 is a perspective exploded view showing an embodiment of a portable wireless unit of the invention.
Figure 3:
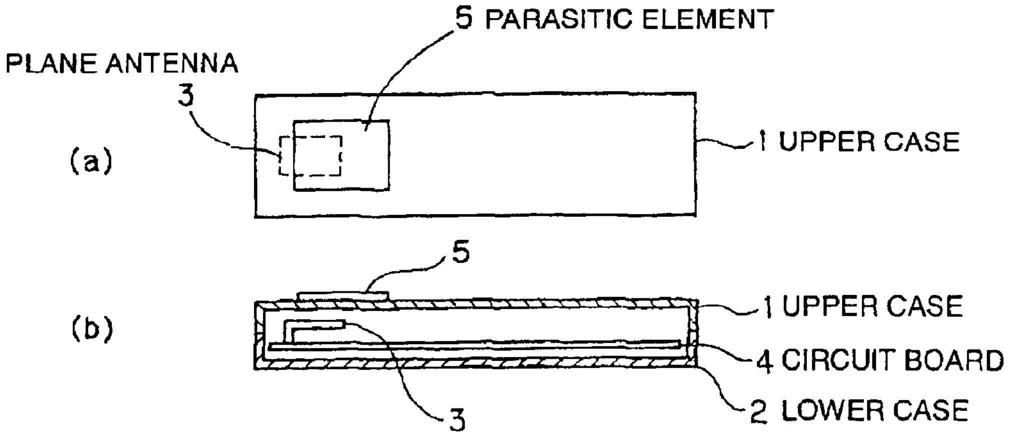
FIG. 3 is a diagram showing the portable wireless unit of FIG. 2 after assembled, in which (a) is a plan and (b) is a side sectional view.

FIG. 2 and FIG. 3 show an embodiment of a portable wireless unit of the invention. In FIG. 2, main parts are shown in disassembled state, and FIG. 3 shows an assembled state, in which (a) is a plan and (b) is a side sectional view.

The case forming the casing is composed of an upper case 1 and a lower case 2 of plastic molding, and between the upper and lower cases, there is a circuit board 4 mounting a plane antenna 3 (a first plane antenna) as an excitation element. The circuit board 4 has a multi-layer structure, and the surface of one side forms a grounding plane. The plane antenna 3 is connected directly to the transmission circuit of the circuit board 4, and is excited at a desired frequency (=frequency of transmission and reception, for example, 2 GHz), and its resonance frequency is set at a higher frequency than the desired frequency, and has a narrow band characteristic. The reason of such setting of higher resonance frequency and narrower band is because a parasitic element 5 is provided as a second plane antenna as described below. Since the plane antenna 3 has a higher resonance frequency than the desired operation frequency, its antenna size is smaller than that at the desired operation frequency.

Confronting the plane antenna 3, the parasitic element 5 made of copper plate or other metal plate is placed on the outer surface of the upper case 1. The parasitic element 5 is disposed at a position overlaid in part or whole on the plane antenna 3. Its antenna size is set at a value for obtaining a resonance frequency equal to the desired frequency (frequency of transmission and reception) at the time of excitation of the plane antenna 3. In this case, the higher the resonance frequency of the plane antenna 3, the larger is the size of the parasitic element 5, and the lower the resonance frequency of the plane antenna 3, the smaller is the size of the parasitic element 5. The parasitic element 5 is a radiation source for radiating radio waves, and the plane antenna 3 functions as an excitation source for resonating the parasitic element 5 at a desired frequency.

Since a desired frequency is obtained by exciting the plane antenna 3 at higher frequency than the desired frequency, the relation between the plane antenna 3 and parasitic element 5 is in tuning and coupling relation, and it is considered that the parasitic element 5 becomes a load to the plane antenna 3 to lower the impedance. By the presence of the parasitic element 5, as seen from the plane antenna 3 reduced in size, the effective antenna area is increased (that is, it is the same effect as when the size of the entire antenna is increased, and the resonance frequency of the entire antenna is lower than the independent resonance frequency of the plane antenna 3).

Hitherto, in order to achieve two-resonance or wider band, a parasitic element is disposed opposite to a current feeding element, as described, for example, in "ZUKAI Mobile Communications Antenna System" (K. Fujimoto, Y Yamada, K. Tsunekawa, p 126, FIG. (f), Sougou-Denshi-Sha). In this case, too, the sizes of the current feeding element and parasitic element are set at different sizes according to two frequencies or bands desired to be obtained. Unlike this invention, it is not intended to obtain one resonance frequency, and the size of the current feeding element (plane antenna in the invention) is set to one frequency of two-resonance, or the frequency at the upper limit side or lower limit side of the band. In the invention, by contrast, the size of the plane antenna 3 is set so as to resonate at a higher frequency than the desired frequency, and when the parasitic element 5 is coupled, it is designed so that [plane antenna 3+parasitic element 5] may resonate at a desired frequency as one antenna, which is a major difference from the prior art.

Further, although not shown in the drawing, the liquid crystal display and key block are installed at specified positions on the upper case 1. Moreover, as required, a whip antenna is installed at a specified position of the upper case 1.

Thus, pairing with the plane antenna 3, the parasitic element 5 is provided on the upper case 1, and the parasitic element 5 is excited by the plane antenna 3, and this parasitic antenna 5 is used as the radiation source. Since the resonance frequency of the plane antenna 3 can be set higher than the intended operation frequency, the size of the plane antenna 3 can be reduced. Hence, the occupied area in the case is reduced, and the effective antenna area can be increased by combination with the parasitic element 5.

As a result, the plane antenna is reduced in size, and the area of the circuit board 4 may be smaller, and the portable wireless unit is small and light, and the space for accommodating other parts can be increased. Since the plane antenna 3 and parasitic element 5 resonate at a desired frequency as one antenna, the antenna characteristics (frequency band, radiation efficiency, etc.) can be enhanced. Further, since the parasitic element 5 is not supplied with current, the current feeding wire to be connected to the circuit board 4 is not needed, and the manufacturing process is not complicated.

Figure 4:
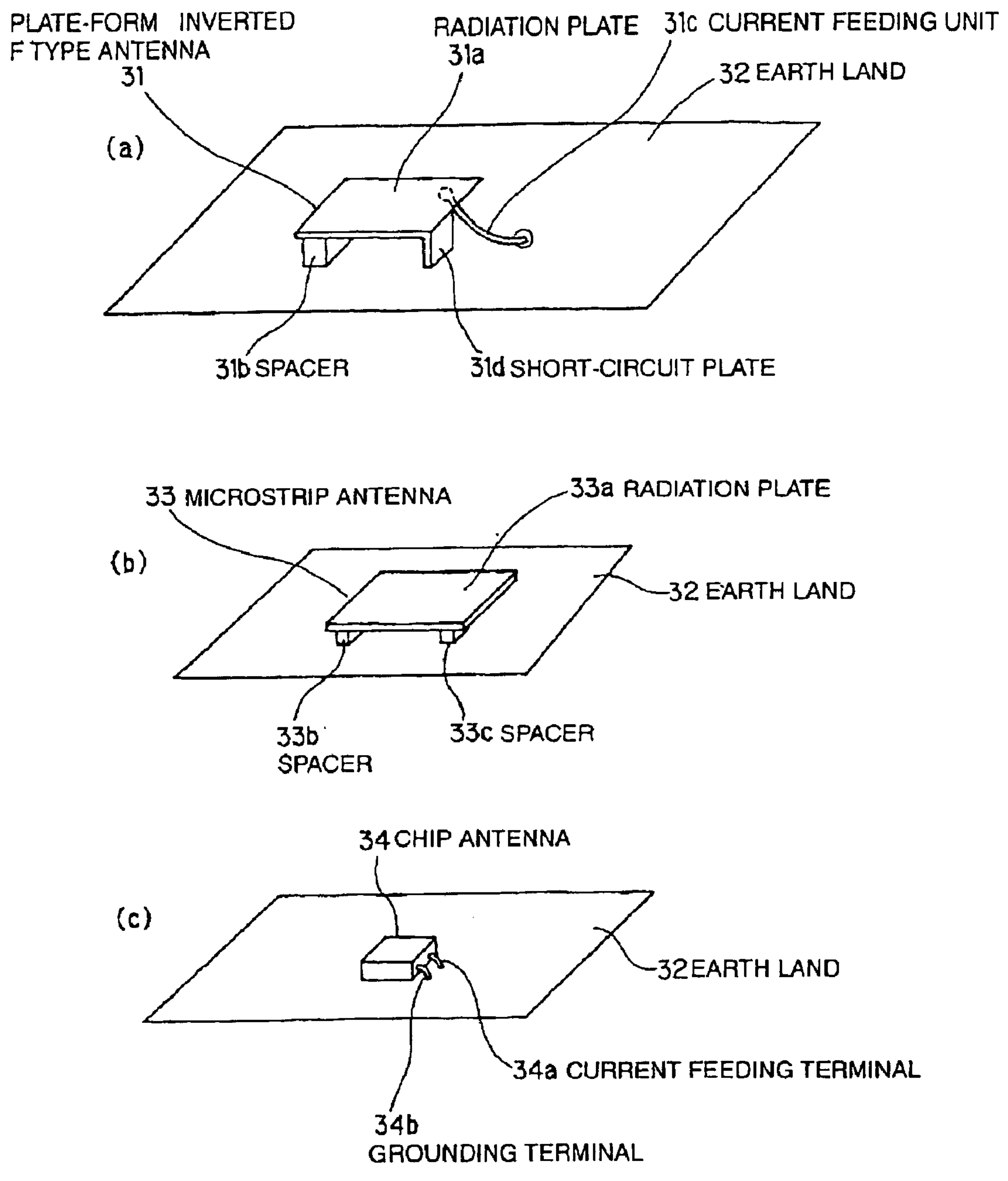
FIG. 4 shows a specific example of a plane antenna of the invention, in which (a) is an example of a plate-form inverted F type antenna, (b) is an example of a microstrip antenna, and (c) is a perspective view showing an example of a chip antenna.
Figure 6:
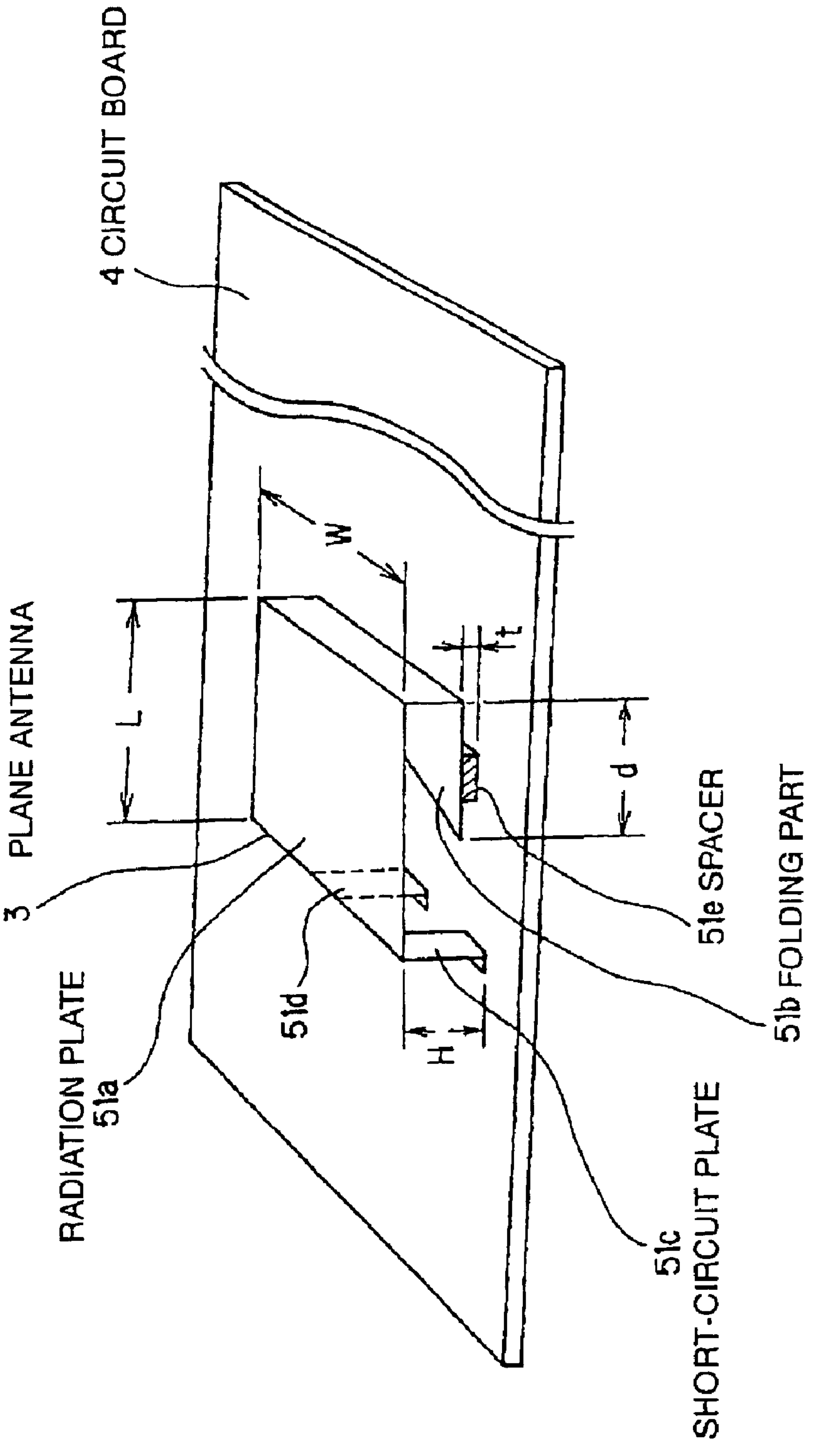
FIG. 6 is a perspective view showing an embodiment of a plane antenna type in FIG. 4(*a*).

FIG. 4 shows a specific example of the plane antenna 3. In FIG. 4(*a*), a plate-form inverted F type antenna explained in FIG. 6 is used as the plane antenna 3. A plate-form inverted F type antenna 31 comprises a radiation plate 31*a*, a spacer 31*b* made of dielectric (or non-dielectric) material for positioning the radiation plate 31*a* on an earth land 32 of the circuit board, a current feeding unit 31*c* connected to the output terminal of the circuit board 4 disposed through this spacer 31*b*, and a short-circuit board 31*d* for connecting a part of the radiation plate 31*a* and the earth land 32.

In FIG. 4(*b*), a microstrip antenna 33 is used as the plane antenna 3, and it comprises a band-like radiation plate 33*a* formed of a microstrip line on an insulator, and a pair of spacers 33*b*, 33*c* for holding this radiation plate 33*a* on the earth land 32 of the circuit board.

FIG. 4(*c*) shows an example of using a chip antenna 34 as the plane antenna 3. The chip antenna 34 is made of a dielectric material as the base material, and a pair of electrodes are integrated on the dielectric material as an antenna element. This chip antenna 34 is fixed on the earth land 32 of the circuit board, and comprises a current feeding terminal 34*a* connected to the current feeding unit of the circuit board 4, and a grounding terminal 34*b* connected to the earth land 32.

Figure 5:
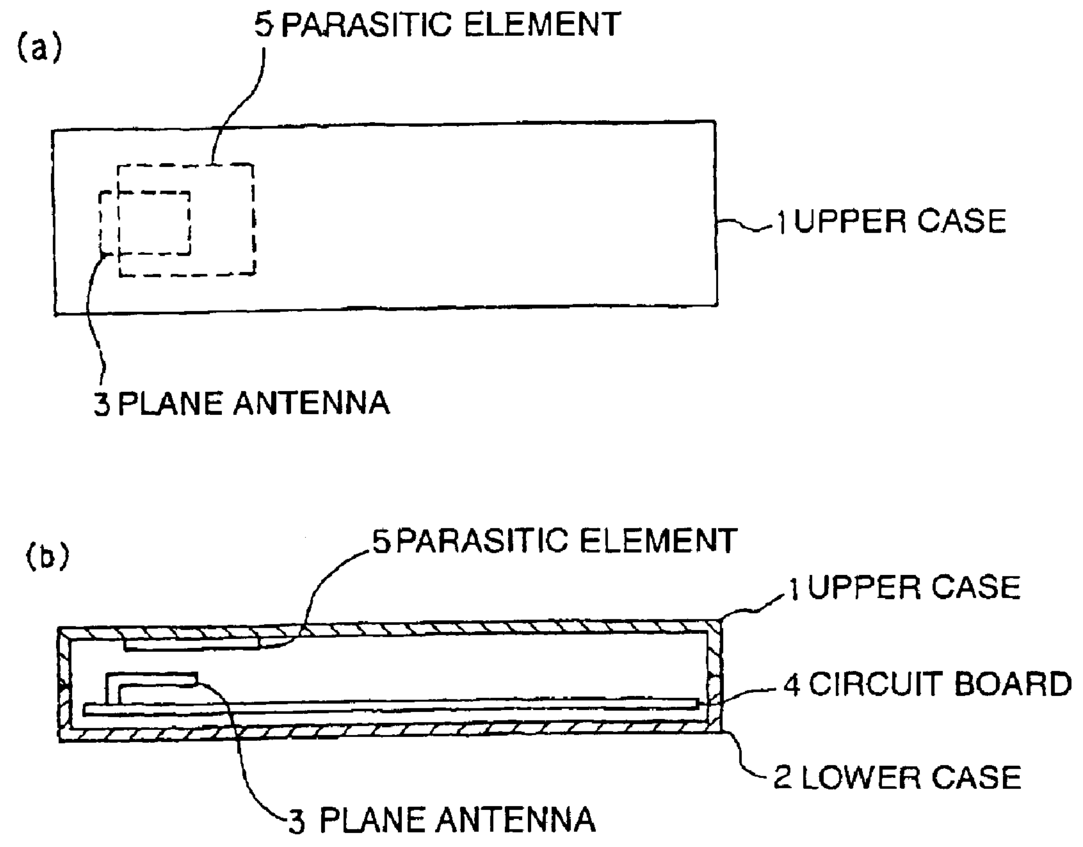
FIG. 5 shows other embodiment of a portable wireless unit of the invention, in which (a) is a plan, and (b) is a side sectional view.

FIG. 5 shows other embodiment of the portable wireless unit of the invention. In FIG. 5, (a) is a plan, and (b) is a side sectional view.

In this embodiment, the parasitic element 5 is disposed at the confronting position of the plane antenna 3 on the inner wall of the upper case 1. This embodiment is suited to the case in which there is a sufficient space in the case, or the thickness of the case is permitted, and since the parasitic element 5 is protected by the upper case 1, it does not require a partial cover for protecting the parasitic element 5, or a decorative member for improving the appearance.

In FIG. 5, according to a structure of projecting the parasitic element 5 from the inner surface of the upper case 1, it may be buried in the upper case 1, and the inner surface of the upper case 1 may be 5 flat.

[Embodiment]

FIG. 6 shows an embodiment of a plane antenna type of FIG. 4(*a*) A plane antenna 51 comprises a radiation plate 51*a* disposed on the surface of the upper case 1, a folding part 51*b* formed by folding and bending to one side of the radiation plate 51*a*, short-circuit plates 51*c*, 51*d* formed at other side of the radiation plate 51*a*, and a spacer 51*e* for insulating and holding the folding part 51*b*. The folding part 51*b* is provided for forming an electrostatic capacity, and the short-circuit plates 51*c*, 51*d* function as the stabs for determining the resonance frequency.

The dimensions of the parts in the case of desired frequency of 2 GHz are as follows: the circuit board 4 measures 120 mm×35 mm, the radiation plate 51*a* is 10 mm in length L and 7 mm in width W, the height H of the short-circuit plates 51*c*, 51*d* is 5 mm, the horizontal plane length d of the folding part 51*b* is about 7 mm, and the thickness t of the spacer 51*e* is 1 mm. The resonance frequency of the plane antenna 51 differs depending on the interval and relative position to the parasitic element 5, and mounting state of other parts, but it is generally about 1.5 times of the desired frequency (2 GHz herein).

On the other hand, the parasitic element 5 is a copper plate of 20 mm in width and 60 to 70 mm in length, and its resonance frequency is about 3 to 5 GHz ideally, but it varies depending on the interval and relative position to the plane antenna, and mounting state of other parts, and hence it is determined experimentally.

As explained herein, according to the portable wireless unit of the invention, comprising a first plane antenna in a size having a higher resonance frequency than the frequency of transmission and reception, a second parasitic plane antenna is disposed in the outer surface or inner surface of the case opposite to this plane antenna, and therefore the antenna occupied area in the case is smaller, and the effective antenna area can be increase by coupling of the second plane antenna, so that the case space can be utilized effectively, and the portable wireless unit is reduced in size and weight, and the accommodating (mounting) efficiency is enhanced. Further, the combination of the first and second plane antennas may function as one antenna so as to have one resonance characteristic, and thereby the antenna characteristic may be enhanced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

The text of the abstract filed herewith is repeated here as part of the specification.

A portable wireless unit of the invention has a first plane antenna smaller than an antenna size determined by a desired frequency, and a second plane antenna presenting, when coupled together with the first plane antenna, an antenna size determined by the desired frequency.

What is claimed is:

1. A portable wireless unit comprising:

a first plane antenna, disposed on a circuit board incorporated within a casing of the wireless unit, for receiving a current for excitation thereof, the first plane antenna having a single resonant frequency and a smaller size than a size associated with a desired frequency; and a parasitic second plane antenna, provided on an outer surface or inner surface of said casing, for presenting, when coupled together with said first plane antenna, an antenna size associated with said desired frequency.

2. The portable wireless unit of claim 1, wherein said first plane antenna is a plate-form inverted F type antenna, microstrip antenna, or chip antenna.

3. The portable wireless unit of claim 1, wherein said first plane antenna has a narrow band.

4. The portable wireless unit of claim 1, wherein said second plane antenna is disposed so as to be overlaid in a part or whole on said first plane antenna.

* * * * *